(12) United States Patent
Nania

(10) Patent No.: US 8,727,395 B2
(45) Date of Patent: May 20, 2014

(54) LATCH MECHANISMS FOR SLIDABLE WINDOWS

(75) Inventor: Adrian Nania, Rochester, MI (US)

(73) Assignee: Webasto SE, Stockdorf (DE)

( * ) Notice: Subject to any disclaimer, the term of this patent is extended or adjusted under 35 U.S.C. 154(b) by 653 days.

(21) Appl. No.: 12/885,812

(22) Filed: Sep. 20, 2010

(65) Prior Publication Data
US 2012/0068478 A1    Mar. 22, 2012

(51) Int. Cl.
*E05C 1/12* (2006.01)

(52) U.S. Cl.
USPC ............ 292/165; 292/160; 292/163; 292/177

(58) Field of Classification Search
USPC ................ 292/163–169, 177–180, 142, 160, 292/DIG. 6, DIG. 7, DIG. 20, DIG. 46, 292/DIG. 47, DIG. 35
See application file for complete search history.

(56) References Cited

U.S. PATENT DOCUMENTS

| | | | | |
|---|---|---|---|---|
| 1,481,775 A | * | 1/1924 | McKinnis | 292/170 |
| 1,630,153 A | * | 5/1927 | Williams | 292/40 |
| 1,704,946 A | * | 3/1929 | Lindgren | 292/5 |
| 1,831,067 A | * | 11/1931 | Hansen | 292/167 |
| 2,108,359 A | * | 2/1938 | Accardi | 292/34 |
| 2,187,660 A | * | 1/1940 | Larson | 292/152 |
| 2,967,595 A | * | 1/1961 | Zitomer | 49/450 |
| 4,695,081 A | * | 9/1987 | Boykin | 292/96 |
| 4,920,698 A | * | 5/1990 | Friese et al. | 49/380 |
| 4,973,091 A | * | 11/1990 | Paulson et al. | 292/51 |
| 5,169,205 A | * | 12/1992 | James | 296/146.16 |
| 6,076,304 A | * | 6/2000 | Carrier | 49/342 |
| 2004/0239121 A1 | * | 12/2004 | Morris | 292/39 |

* cited by examiner

*Primary Examiner* — Mark Williams
(74) *Attorney, Agent, or Firm* — Fitch Even Tabin & Flannery LLP

(57) ABSTRACT

Latch mechanisms for a slidable window generally disposed about the center of mass of a window pane on an edge perpendicular to its travel path to provide a straight line-pull using minimal mechanical effort and to provide a plurality of latch points to selectively secure a window pane in place along its travel path. Preferred embodiment provides a latch assembly for a window having first and second parallel edges slidably disposed between parallel first and second guiderails of a frame and can have a housing attached to a third window edge perpendicular to the first and second parallel sides, a latch handle connected to a drive gear engaged to a locking element slidably disposed within a channel of a housing in response to rotation of the drive gear about a pivot; the locking element movable from a biased extended position to a retracted position in response to rotation of the drive gear by a force sufficient to overcome the bias; and the first guiderail having a plurality of recesses spaced along the window travel path to receive the first end of the locking element in the operational position.

8 Claims, 7 Drawing Sheets

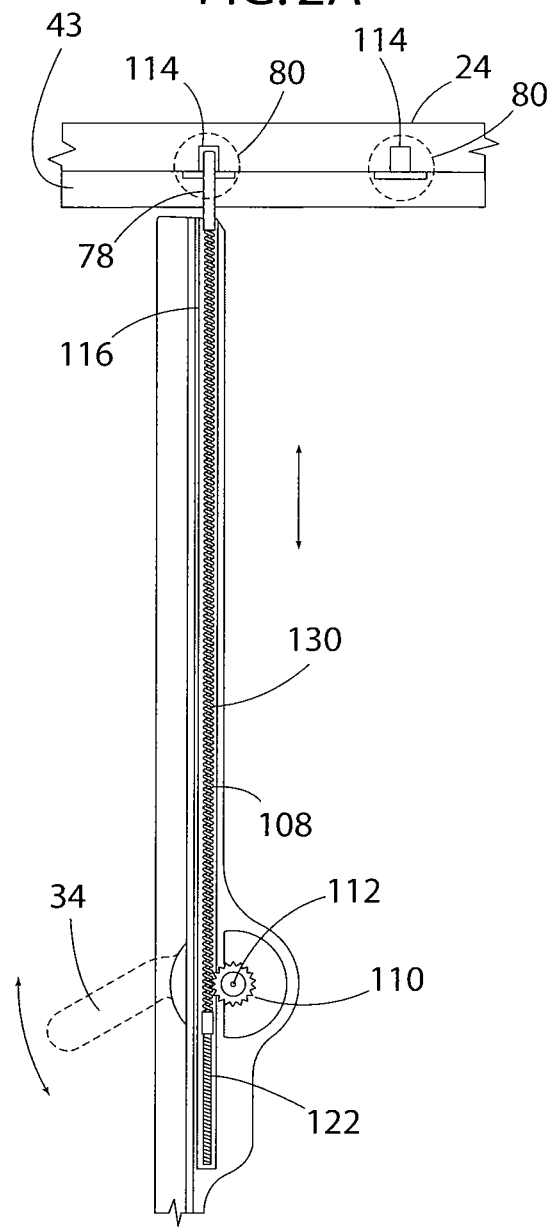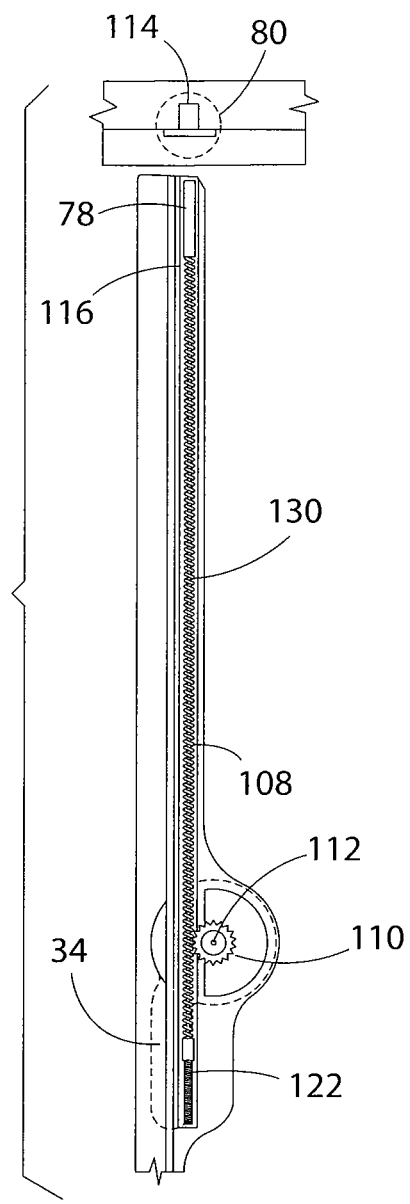

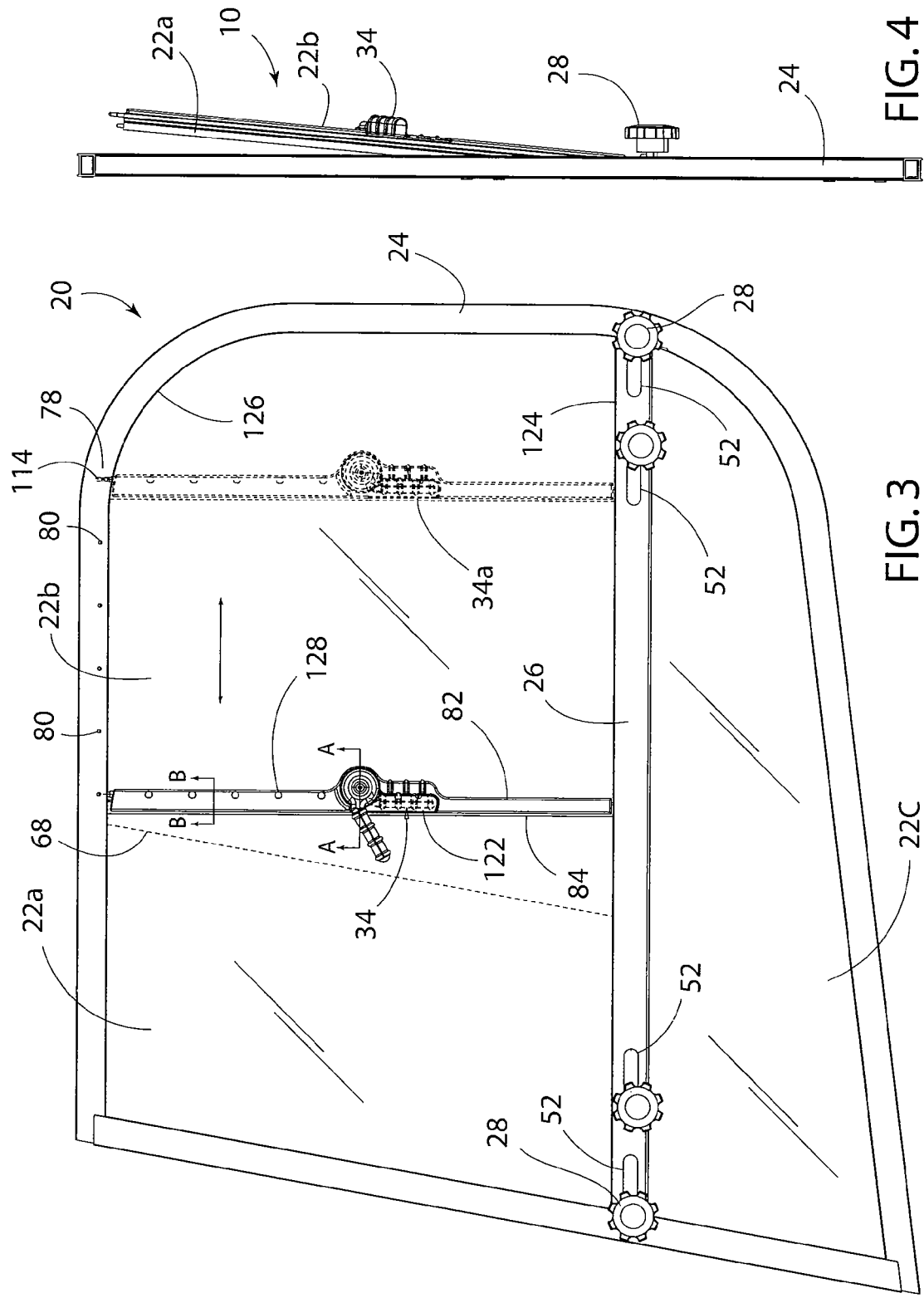

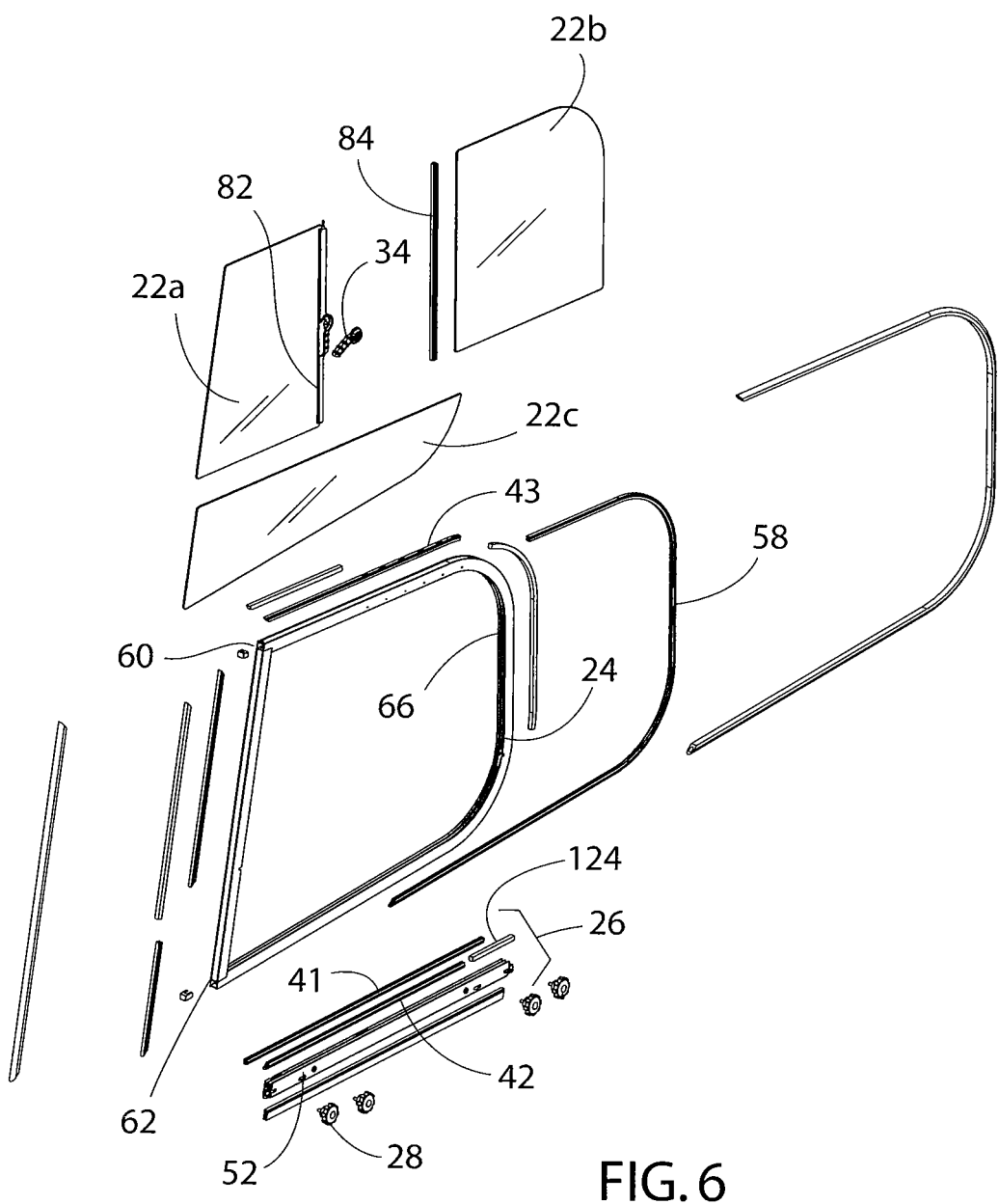

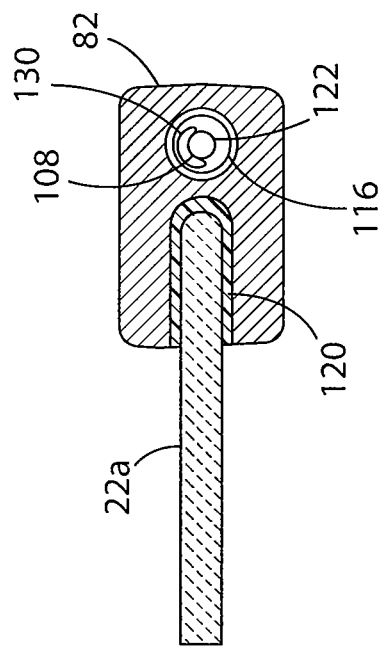
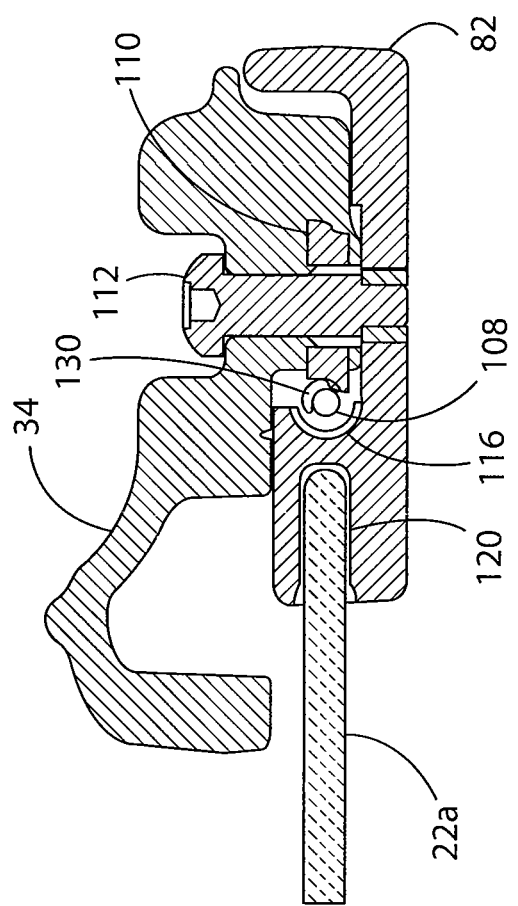
FIG. 8
FIG. 7

LATCH MECHANISMS FOR SLIDABLE WINDOWS

FIELD

The present mechanisms and methods generally relate to window systems, and specifically to latch mechanisms for slidable windows.

BACKGROUND

Work vehicles, such as tractors, combines, front-end loaders, excavators, and the like, typically have enclosed cabs with large window assemblies to provide ventilation and to allow an operator a good view of their work environment. Frequently, these window assemblies provide multiple fixed and/or movable window panes within a perimeter frame.

In the art, during vehicle assembly, a window assembly can be attached to a body side wall as a single complete unit or in pieces. In most instances the window assembly is permanently attached from the outside of the vehicle by its perimeter frame with a weatherproof seal using compressible sealing rings, adhesives, and the like. Protective caging can also be added to the outside surface of the window assembly to protect window panes and the vehicle operator from stray impact.

Often these types of window assemblies have at least one slidable panel, such as a slidable window pane. Given the sometimes extreme work environment to which these window assemblies are exposed, it is desirable to secure the window pane from unintended travel along its path. Therefore, latch mechanisms associated with the slidable aspect of a window pane should provide a simple and rugged design to not only facilitate ease of movement of the window pane, but also to provide a means to secure the window in place at a plurality of positions along its travel path.

Known in the art are latching mechanisms for slidable windows that attach to a window pane corner or corners. For example, the latching mechanism can restrict window pane movement through the use of a locking pin on the latching mechanism that can selectively engage any one of a plurality of locking pin openings within a window assembly frame along its travel path. In one embodiment, the latching mechanism can be disengaged by squeezing two lever elements together to withdraw the locking pin from the window assembly frame. Other embodiments can provide two corner latching mechanisms that can require a user to simultaneously slide spring loaded locking pins out of the window frame. These types of mechanisms are common on windows with vertical travel paths.

Unfortunately, latching mechanisms positioned on a window pane corner can be difficult to operate (such as when a user is wearing gloves). Also, the window may bind during attempted travel. For example, this racking condition can occur when a user grabs the latching mechanism to unlatch the locking pin and push or pull the window to a new position. Specifically, the reactive moment causes a rotational value instead of a straight line pull. Overcoming the rotational effects of a corner pull may require an operator to use both hands to complete window movement. The same is true for dual latching mechanism on two corners of the same window pane.

Attempts to overcome the shortcomings of the rotational effect to a window as it travels along its path can provide a simple latching mechanism on or about the center of a window pane edge perpendicular to its travel path (e.g., along a vertical axis of a horizontally sliding window pane). See generally, U.S. Pat. No. 7,036,851 to Romig and EP 1 700 979 B1 to Jurgen et al. These solutions are not complete though in that it typically only retains movement of the window pane in its closed position and/or provides a complicated mechanism which may be a maintenance issue for window assemblies in harsh working environments. Thus, despite the advances of the current state of the art, further improvements in window latch mechanisms for slidable windows are possible and desired.

SUMMARY

Accordingly, there is provided herein latch mechanism embodiments for a slidable window that overcomes the noted deficiencies in the art. Specifically, the present embodiments provide latch mechanisms for a slidable window generally disposed about the center of mass of a window pane on an edge perpendicular to its travel path. The present embodiments provide a balanced straight line pull using minimal mechanical effort and to provide a plurality of latch points to selectively secure a window pane in place along its travel path.

A preferred embodiment provides a latch assembly for a window having first and second parallel edges slidably disposed between parallel first and second guiderails of a frame and can have a housing attached to a third window edge perpendicular to the first and second parallel sides, a latch handle connected to a drive gear engaged to a locking element slidably disposed within a channel of a housing in response to rotation of the drive gear about a pivot; the locking element movable from a biased extended position to a retracted position in response to rotation of the drive gear by a force sufficient to overcome the bias; and the first guiderail having a plurality of recesses spaced along the window travel path to receive the first end of the locking element in the operational position.

In some embodiments, the bias can be achieved by a compression spring, a coil spring, rubber, or an elastic polymer applying a compressive force to a second end of the locking element.

In some embodiments, the latch handle can be a single lever having an orientation angle of about 25 to 45 degrees from the axis of the third window edge in an operating position.

Optional features can include a plurality of view holes adjacent to the plurality of recesses spaced along the window travel. The locking element can also be a wire-wound noncompressible cable.

Preferably, the latch handle is positioned to correspond to the center of mass along the third edge of the window, whereby a balanced pull-line is achieved.

In another embodiment, a second locking element can be provided to mirror the first locking element in an opposite direction from a biased extended position to a retracted position in response to rotation of the drive gear by a force sufficient to overcome the bias; and the second guiderail having a plurality of recesses spaced along the window travel path to receive the first end of the second locking element in the operational position.

Other preferred embodiments provide a window assembly that can have a window having first and second parallel edges slidably disposed between parallel first and second guiderails of a frame; a latch assembly having a housing attached to a window edge perpendicular to the first and second parallel sides, the latch assembly having a latch handle connected to a drive gear engaged to a locking element slidably disposed within a channel of a housing in response to rotation of the drive gear about a pivot; the locking element movable from a biased extended position to a retracted position in response to rotation of the drive gear by a force sufficient to overcome the bias; and the first guiderail having a plurality of recesses spaced along the window travel path to receive the first end of the locking element in the operational position. The guiderails can be horizontal.

Other features will become more apparent to persons having ordinary skill in the art to which pertains from the following description and claims.

BRIEF DESCRIPTION OF THE DRAWINGS

The foregoing features, as well as other features, will become apparent with reference to the description and Figures below, in which like numerals represent elements, and in which:

FIG. 2 is a cutaway view of a latch mechanism for a sliding window according to the present embodiments in a latched (2A) and unlatched (2B) position.

FIG. 3 is a side view of a window assembly having a latch mechanism for a sliding window according to the present embodiments.

FIG. 4 is an end view of a window assembly having a latch mechanism for a sliding window according to the present embodiments.

FIG. 6 is an exploded perspective view of a window assembly having a latch mechanism for a sliding window according to the present embodiments.

FIG. 7 is a sectional view of a window assembly latching mechanism according to the present embodiments taken along section lines A-A in FIG. 3 in an operational mode.

FIG. 8 is a sectional view of a window assembly latching mechanism according to the present embodiments taken along section lines B-B in FIG. 3 in an unlatched mode.

DETAILED DESCRIPTION

Figure 1:
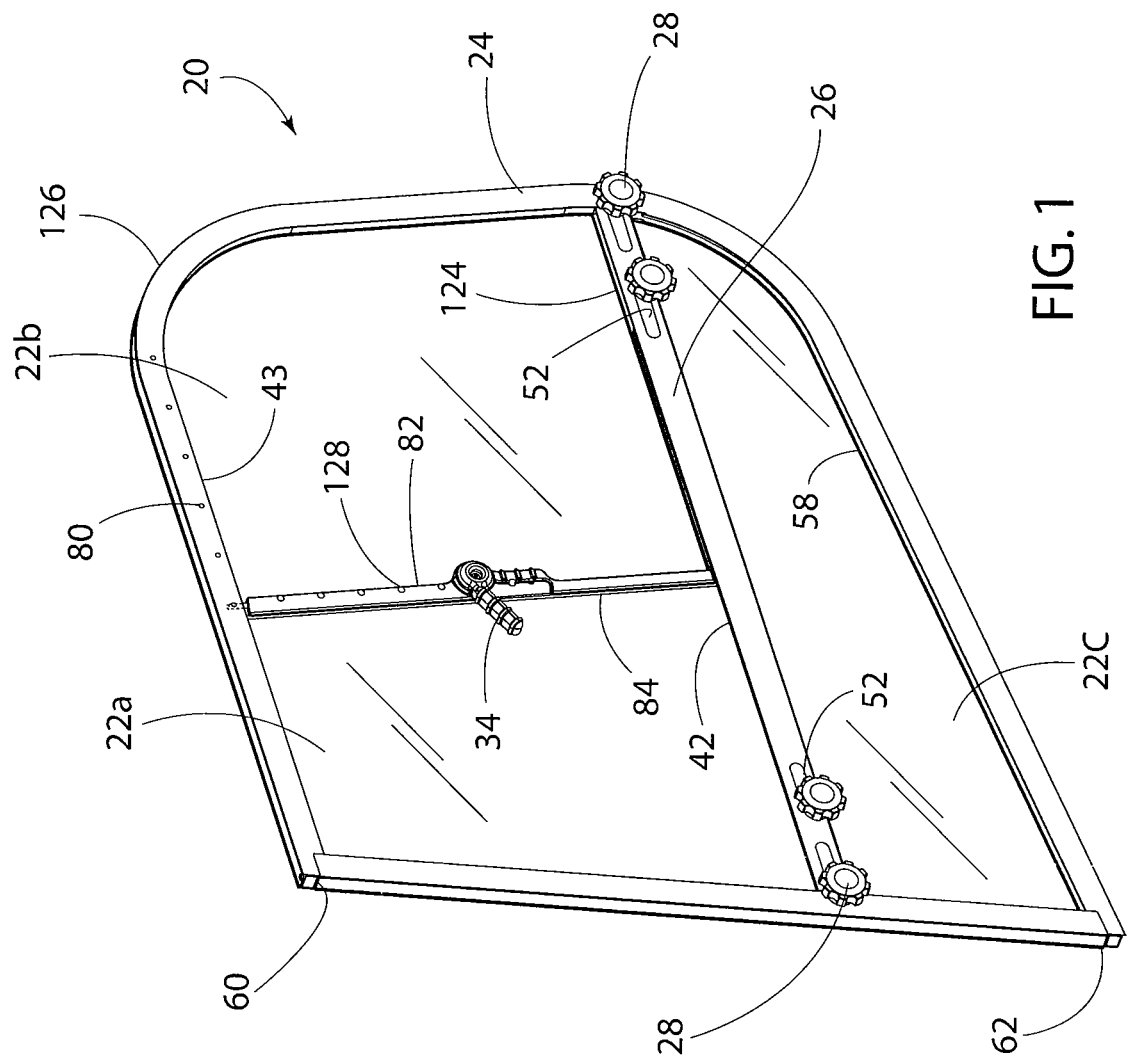
FIG. 1 is a perspective view of a window assembly having a latch mechanism for a sliding window according to the present embodiments.

The present embodiments provide latch mechanisms for a slidable window generally disposed about the center of mass of a window pane on an edge perpendicular to its travel path. The present embodiments provide a balanced straight line pull using minimal mechanical effort and to provide a plurality of latch points to selectively secure a window pane in place along its travel path.

The present embodiments provide easy travel and easy latching/unlatching of a slidable window unit, which has multiple latching points along its path of travel. The mechanisms are simple to manufacture, easy to maintain and easy to operate. Although the illustrated embodiments are described for a horizontally slidable window assembly for a work vehicle, it is noted that many other applications and embodiments are possible within the scope of its elements, including vertically slidable window panes. Further, for ease of understanding the present embodiments, only one latch pin is illustrated, though dual latching pins travelling to opposite ends of a window pane are also possible.

In one embodiment, a pull and engage/disengage feature is centered on a generally square window pane. The preferred point of the pull and engage/disengage feature is on a window pane edge that is perpendicular to its travel path, and specifically at a location on the edge that is centered to the center of mass of the window pane. Factors that can alter direct center placement of the pull and engage/disengage feature can include the geometry of the window (which alters the location of the center of mass) and the coefficient of friction of the window pane against its upper and lower seals. As such, the present embodiments preferably provide a straight line pull to eliminate a racking condition while the window pane slides. This can allow one handed operation. Reduction and/or elimination of the racking condition allows longer life of the window seals, thus reducing maintenance costs and vehicle down time.

Ease of use can further be improved through the use of a window latch lever that is easy to grasp, even if a user is wearing gloves. This is provided through the preferred illustrated embodiments of the window latch lever that is sized, shaped, and positioned to allow greatly improved ease of use over the art. Because a single lever is employed, pinching of components is eliminated, thus reducing risk of injury to an operator.

The present embodiments still allow for a latching pin to be deployed into a latch pin opening along the window assembly perimeter frame. Preferred embodiments provide for multiple openings along its travel path within the perimeter frame to provide a plurality of secured positions, whether opened or closed.

Turning now to the Figures. Shown are the present embodiments incorporated into a large window assembly for a work vehicle. In the art, removal of large window assemblies is difficult due to their inherent size and weight. Typical configurations can include three window panes including a lower fixed pane and two upper split panes. Optionally, some panes may be slidable along a track to provide ventilation. Also, protection against stray impact to these assemblies can be included through fixed caging.

Generally, one embodiment of the present design is provided for a three glass panel window unit assembly with a center bar separating two upper panels from a fixed lower panel and is generally indicated at 20 in the Figures. The window unit can be attached to any number of wall openings in a variety of applications. Preferably, the wall is upright. As shown in FIG. 1, window unit 20 is preferably formed by a perimeter frame 24 that is fused at all joints. Perimeter frame 24 can be formed from extruded aluminum, composites, plastics, other metals, and combinations thereof. In the illustrated embodiment of FIG. 1, two break points 60 and 62 are shown in perimeter frame 24. Break points 60 and 62 can be sealed by any means to provide a weatherproof seal, and can include welding (such as arc welding or spot welding), gluing, or use of fastening means, such as screws, rivets, and the like. Where fastening means are used, a powder coating over fastened break points 60 and 62 can provide additional weatherproof sealing. Perimeter frame 24 can have an interior channel 66 configured to receive a perimeter channel seal 58. Perimeter channel seal 58 (and all seals to the window panes) can be made of an elastomeric substance suited to provide a friction fit and weather tight seal for window unit 20 window panes. The friction fit is also configured to allow a user to be able to remove the glass pane without use of additional tools and in some instances allow a window pane to slide to create an opening.

For illustrative purposes, the embodiments of the present window unit provide two upper panes 22a and 22b, and a lower pane 22c. Panes 22 can be held stationary in the assembled position by perimeter seal 58 and a center bar 26. Pane 22a can be held on its lower edge within center bar 26 channel having seal 41. Pane 22a can also be held in place along its upper edge by a perimeter seal. Pane 22b can be held stationary on its lower edge within center bar 26 channel having seal 43 and along its top edge by a second perimeter seal. Pane 22c can be held in place on its upper edge by seal 42 disposed within a lower center bar channel. Again, seals 40, 41 and 42 provide a friction fit to hold the pane in place and provide a weather tight seal.

Figure 5:
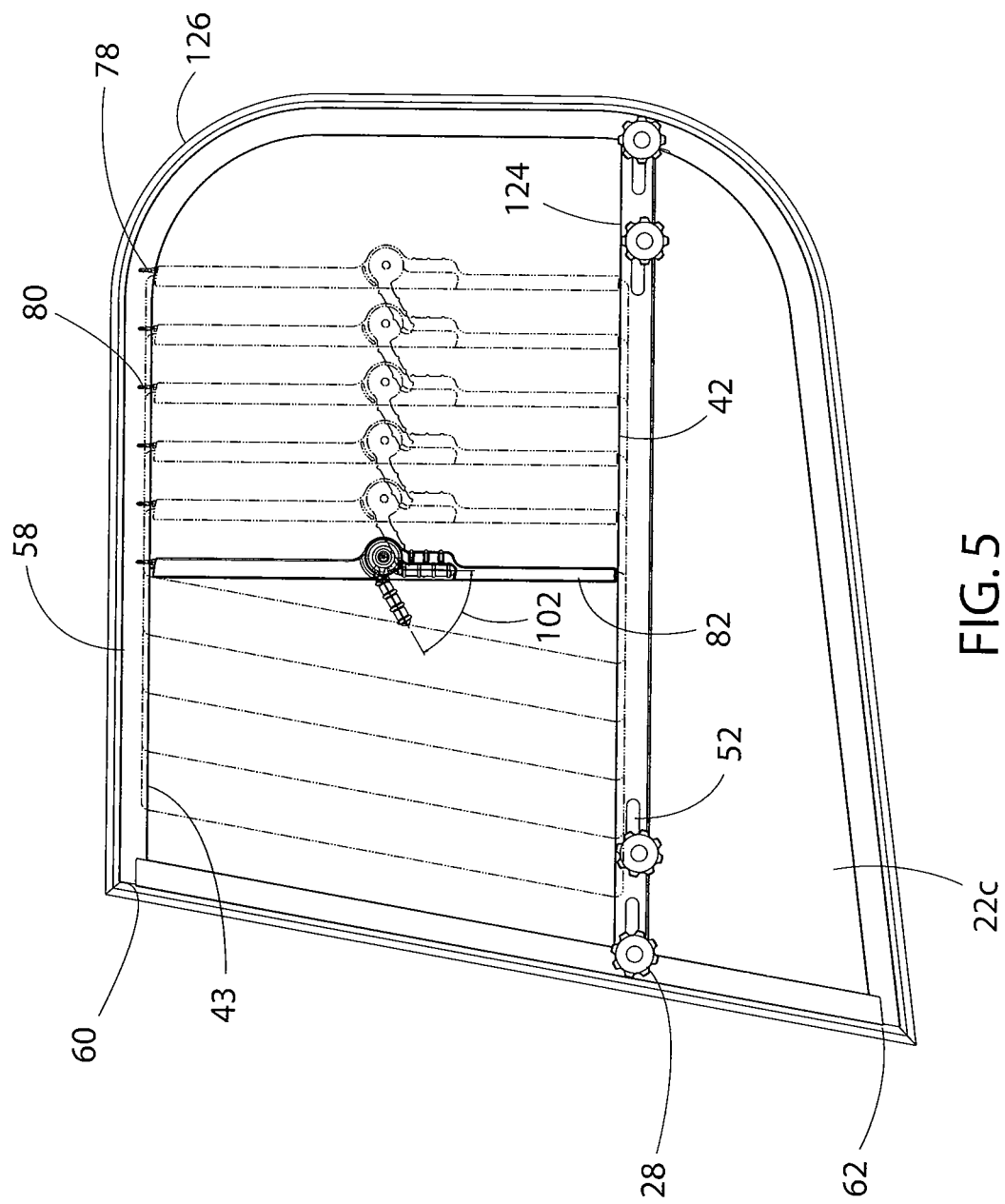
FIG. 5 is a side view of a window assembly having a latch mechanism for a sliding window according to the present embodiments in various latched positions.
Figure 12:
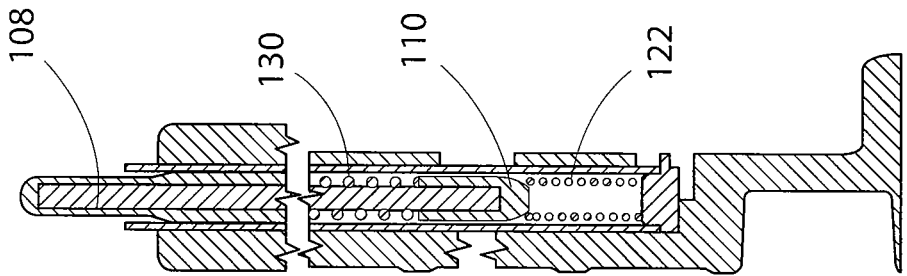
FIG. 12 is a sectional view of a window assembly latching mechanism according to the present embodiments taken along section lines D-D in FIG. 10 in an unlatched mode.
Figure 11:
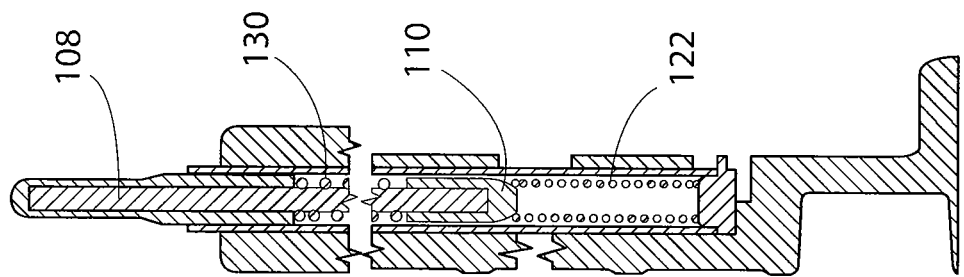
FIG. 11 is a sectional view of a window assembly latching mechanism according to the present embodiments taken along section lines C-C in FIG. 9 in an operational mode.
Figure 10:
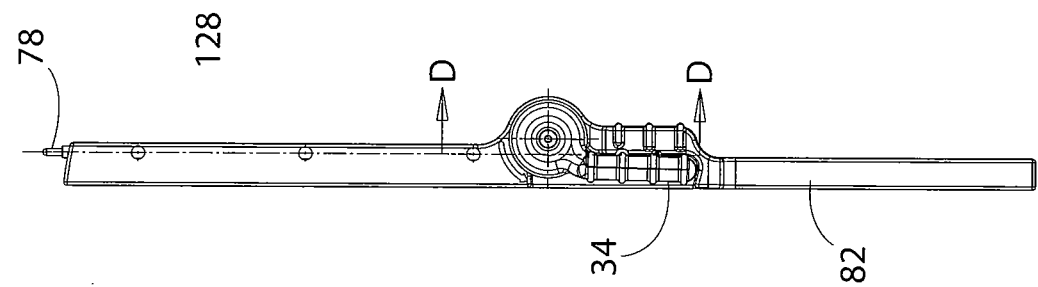
FIG. 10 is a side view of a latch mechanism for a sliding window according to the present embodiments in an unlatched position.
Figure 9:
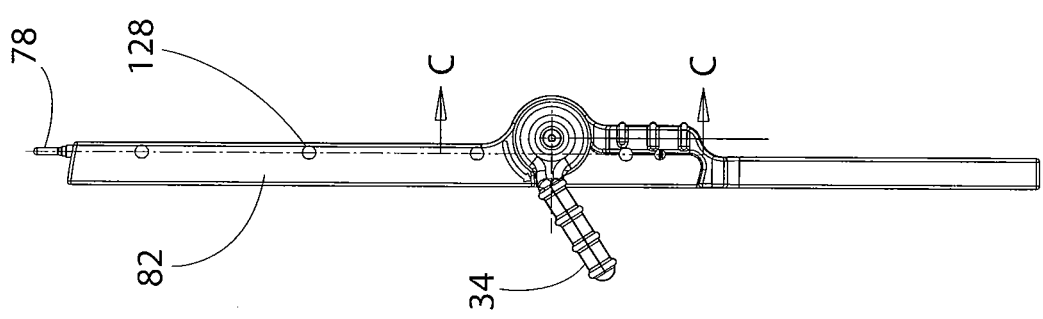
FIG. 9 is a side view of a latch mechanism for a sliding window according to the present embodiments in a latched position.

Also, as shown, pane 22a is slideable from a closed position to an open position 68 (See FIGS. 3 and 5). Therefore seal 42 friction fit should allow a user to slide pane 22a from an open and closed position while maintaining a seal against weather. Stop 124 (See FIG. 6) prevents opening pane 22a past a predetermined point. In this case, stop 124 is configured to be ahead of the radius 126 in the upper corner of perimeter frame 24.

As shown in the Figures, the latching mechanism of the present embodiments can be positioned on a housing bar 82 that can be permanently affixed to pane 22a on its reward vertical edge and can have weather tight seal edge 84 to seal the area between panes 22a and 22b. As shown in FIGS. 7 and 8, pane 22a can be attached to housing bar 82 by an adhesive within a channel 120.

As illustrated, pane 22a can be held secured in place along its travel path by use of a latching mechanism actuated by window latch handle 34. Latch handle 34 can be closed (FIG. 1) in an operational mode to engage a latch pin 78 in a latch pin recess/opening 114 within perimeter frame 24 to restrict pane 22a from sliding, or to an open position 34a (FIG. 1) to retract latch pin 78 from opening 114. Thus, pane 22a can be held in place by a window latch pin 78, which can be actuated to be inserted into a plurality of perimeter frame 24 latch holes 114. It is noted that the present window configuration is for illustration purposes only and other possible configurations are possible as to the number of window panes and openability of those panes.

The latching mechanisms of the present embodiments are thus a housing bar 82 attached to pane 22a as shown generally in FIG. 1 with a seal 84 to provide a weather seal between panes 22a and 22b. A latch handle 34 actuates the release of a latch pin 78 within a latch pin hole 114 in perimeter seal 24. Latch handle 34 is sized, shaped, and positioned to allow greatly improved ease of use. As shown, latch handle 34 is a single lever that in its operational position extends beyond housing bar 82 at an angle (approximately 20 to 160 degrees from the axis of housing bar 82, and preferably about 30 to 45 degrees) to allow easy grasping by a user, even if gloves are worn. Latch handle 34 is also preferably positioned to have a straight line pull to slide pane 22a. Thus, latch handle 34 is preferably placed along a window pane edge that is generally perpendicular to its travel path, and specifically at a location on that edge that is about center to the center of mass of the window pane. Factors that can alter direct center placement of the pull and engage/disengage feature can include the geometry of the window (which alters the location of the center of mass) and the coefficient of friction of the window pane within its upper and lower seals. Thus, as illustrated, latch handle 34 provides a straight line pull to eliminate a racking condition (rotational/tilting torque) while the window pane 22a slides.

The latching mechanism (e.g., using a rack and pinion) to engage a latching pin 78 within latch pin hole 114 is disposed within a channel 116 of housing bar 82. As shown in FIG. 2, latch handle 34 connects to a drive gear 110 disposed within channel 116, which are both pivotable/rotatable around an axis of pivot point 112. Adjacent and engaged to drive locking element 110 such as a wire-wound 130 compression resistant cable 108 retained within channel 116.

A first end of cable 108 can include a latch pin/tip 78 sized to be received within latch pin hole 114. It is noted that latch pin 78 can be a separate tip, such as swedged metal or plastic, but is preferably a tip 114 formed by applying a plastic or metal material on the cable terminal end, such as dipping in a metal or plastic bath. Optionally, latch pin/tip can be a brightly visible color, such as red, which can be viewed through an optional view hole 80 to confirm that tip 78 is engaged within any of the plurality of latch pin holes 114. Further, evidence of movement of locking element 110 can be viewable through another set of optional view holes 128 along the axis of housing bar 82.

Cable 108 is biased into latch pin hole 114 by a compression spring 122 at a second cable end. Compression spring 122 provides sufficient force (e.g., about 5-20 pounds of compressive force) to drive locking element (cable 108) into the frame recess 114 when latch handle 34 is released and to bias cable 108 to remain in recess 114 during vehicle operation. Compressive force of the bias should also be configured to allow a user to overcome the bias with the latch handle 34 with one hand. Thus, the operational mode of the mechanism is to bias latch pin 78 into hole 114 and to hold latch handle 34 to its angled position. Drive gear 110 is positioned so that as latch handle 34 is rotated downward cable 108 withdraws/disengages from latch pin hole 114. As shown, drive gear pivot point 112 is on the opposite side of latch handle 34. Once disengaged, a user can maintain a grip on the latch lever to slide pane 22a to a desired position, where the latch handle can be released. Once released, a user can confirm that pane 22a is secured in place by viewing latch pin tip 78 through any of the viewing holes 80 or by the angled position of latch handle 34.

The illustrated examples of the present latching mechanisms are for illustrative purposes of preferred embodiments. Many variations are possible though within the scope of these embodiments. For example, locking element 108 is shown using wire-wound cable, which is readily available as it is used for many sunroof mechanisms. Nevertheless, rods with corresponding gear teeth engaging drive gear 112 are possible. Latch handle 34 could be a twist knob with colors or indicators showing the position of the locking element 108. Also, other means to bias cable 108 into latch pin hole 114, such as a coil spring, rubber or elastic polymers.

While the embodiments and methods have been described in conjunction with specific embodiments, it is evident that many alternatives, modifications, and variations will be apparent to those skilled in the art in light of the foregoing description.

I claim:

1. A vehicle window assembly including a window having first and second parallel window edges slidably disposed between parallel first and second guiderails of a vehicle window frame, the vehicle window assembly comprising:

a housing attached to a third window edge perpendicular to the first and second parallel window edges, a latch handle connected to a drive gear engaged to a locking element slidably disposed within a channel of the housing in response to rotation of the drive gear about a pivot;

the locking element movable from a biased extended position, where a first end of the locking element extends into the first guiderail to restrict movement of the window relative to the first guiderail, to a retracted position, where the locking element is in the channel of the housing, in response to the rotation of the drive gear about the pivot by a force sufficient to overcome the bias; and the first guiderail having a plurality of recesses spaced along a travel path of the window and adapted to receive the first end of the locking element in the biased extended position.

2. The vehicle window assembly of claim 1, wherein the bias is achieved by a compression spring applying a compressive force to a second end of the locking element.

3. The vehicle window assembly of claim 1, wherein the latch handle is a single lever having an orientation angle of about 25 to 45 degrees from a vertical axis of the third window edge when the locking element is in the biased extended position.

4. The vehicle window assembly of claim 1, wherein the first guiderail further comprises a plurality of view holes adjacent to the plurality of recesses spaced along the travel path of the window.

5. The vehicle window assembly of claim 1, wherein the locking element is a wire-wound non-compressible cable.

6. The vehicle window assembly of claim 1, wherein the latch handle is positioned to correspond to a center of mass along the third edge of the window, whereby a balanced pull-line is achieved.

7. The vehicle window assembly of claim 1, wherein the first and second guiderails are horizontal.

8. The vehicle window assembly of claim 1, wherein the locking element, in response to the rotation of the drive gear about the pivot, is slidable in a direction along a longitudinal axis of the housing from the retracted position into the biased extended position where the first end of the locking element is received in one of the recesses of the first guiderail.

* * * * *